Figure 1:
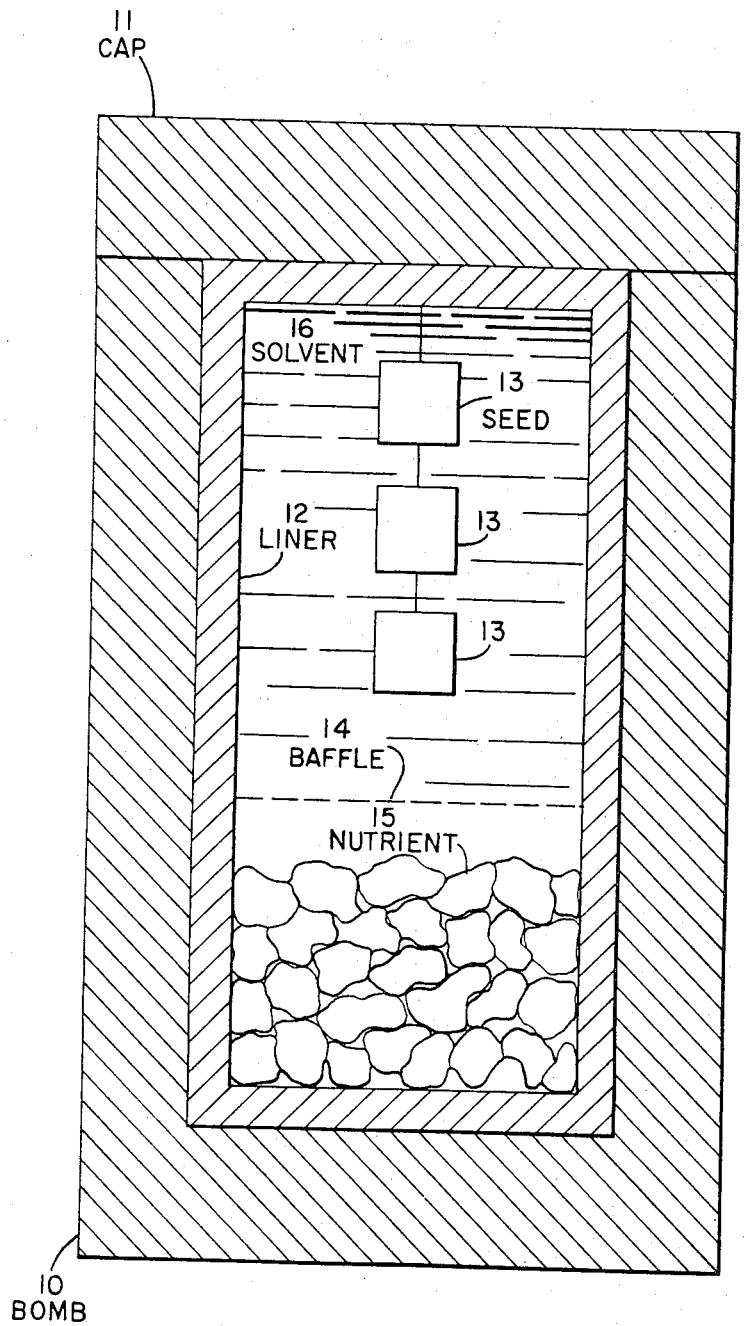

April 9, 1968

A. BECK 3,377,209

METHOD OF MAKING P-N JUNCTIONS BY HYDROTHERMALLY GROWING

Filed May 1, 1964

2 Sheets-Sheet 1

INVENTOR
ALEXANDER BECK

Graham & Baker

AGENTS

April 9, 1968 A. BECK 3,377,209
METHOD OF MAKING P-N JUNCTIONS BY HYDROTHERMALLY GROWING
Filed May 1, 1964 2 Sheets-Sheet 2

INVENTOR
ALEXANDER BECK

Graham & Baker

AGENTS

United States Patent Office 3,377,209
Patented Apr. 9, 1968

3,377,209
METHOD OF MAKING P-N JUNCTIONS BY HYDROTHERMALLY GROWING
Alexander Beck, Ottawa, Ontario, Canada, assignor to National Research Council, Ottawa, Ontario, Canada, a body corporate of Canada
Filed May 1, 1964, Ser. No. 364,173
1 Claim. (Cl. 148—1.5)

The present invention relates to a method of making P-N junctions and in particular to a method of growing such junctions hydrothermally.

Numerous methods have been developed for the production of P-N junctions. Similarly, hydrothermal techniques for growing crystals are well known, see for example "Hydrothermal Crystal Growth," by R. A. Laudise and J. W. Nielsen, Solid State Physics, vol. 12 (1961) Academic Press, New York and London.

In growing crystals hydrothermally, the crystals are formed by crystallization from a supersaturated solution under conditions of high temperature and pressure. The name "hydrothermal" has been developed by geochemists and mineralogists to describe such actions which take place in the presence of water. As used throughout this disclosure the term includes solvents other than water.

Apparatus for the hydrothermal growth of crystals, for example, of quartz crystals is shown in U.S. Patent Nos. 2,895,812 issued July 2, 1959 to G. T. Kohmar; 3,013,867 issued Dec. 19, 1961 to C. B. Sawyer, and 3,051,558 issued Aug. 28, 1962 to J. M. Jost. The apparatus in each case consists of a bomb or autoclave divided into two regions; an upper crystal growing region, and a lower nutrient region. An aqueous solvent containing suitable mineralizers is contained within the bomb and serves to transport the nutrient from the lower section of the bomb to the crystal seeds mounted in the upper chamber. A baffle or diaphragm is positioned across the bomb above the nutrient and serves to cause a convective flow of the solvent between the upper and lower chambers, and accordingly a temperature differential is maintained between the nutrient section and the crystal growing section. The nutrient is deposited from solution on the seeds, and the crystals are "grown."

In the hydrothermal growth of crystals, difficulties have been encountered due to impurities which are present in the grown crystals. These impurities may originate from the nutrient, solvent, or the liner of the bomb. Impurities have been a source of concern to these engaged in the hydrothermal growth of crystals and numerous attempts have been made to reduce the amount of these impurities by various means.

I have discovered that by proper control of the impurities in growing crystals of semiconducting materials hydrothermally, that P or N type crystals may be grown. By changing the impurities present during the growth of the crystal, it is possible to produce P-N junctions. Various means may be used to change the type of impurities during the growth of the crystal, for example, nutrients or solvents may alternatively be used which donate either P or N doping materials to the growing crystal. Alternatively, during the crystallization process, bomb walls or liners may be used from which either P or N doping materials dissolve. Solids may also be brought into the bomb from which P or N doping materials dissolve alternatively during the crystallization process. For example, a ball which has alternative coats of P and N doping materials may be included within the bomb.

One method for obtaining well defined P-N junctions consists of providing seeds of either P or N type material on which the crystal is to grow and growing a crystal of the opposite conductifity type onto these seeds. In another method, a crystal may be grown with one type of doping material for a predetermined period of time, the crystal growth stopped and resumed using the other type of doping material. By repeating this process, alternate layers of P and N type materials may be built up on the crystal and a plurality of inter-related P-N junctions obtained. The crystals containing these junctions may then be sliced into blanks for further processing into diodes or transistors. The thickness of the P or N layers in the crystal may be controlled by altering the amount of time or other conditions of growth and accordingly semiconductor devices may be formed having different thicknesses of P and N layers.

I have grown P-N junctions using the method of the present invention by inserting seeds of N type iron pyrites ($FeS_2$) in a bomb and growing a P type layer onto these seeds. The crystals obtained are the true cubic crystals characteristic of iron pyrites and contain P-N junctions which exhibit the usual electrical conductivity characteristics of such junctions.

By the use of suitable nutrients, impurities, and solvents, other types of crystals which are semi-conductors may be grown, and by changing the impurities contained in the solvent during growth, P-N junctions may be obtained.

Figure 2:
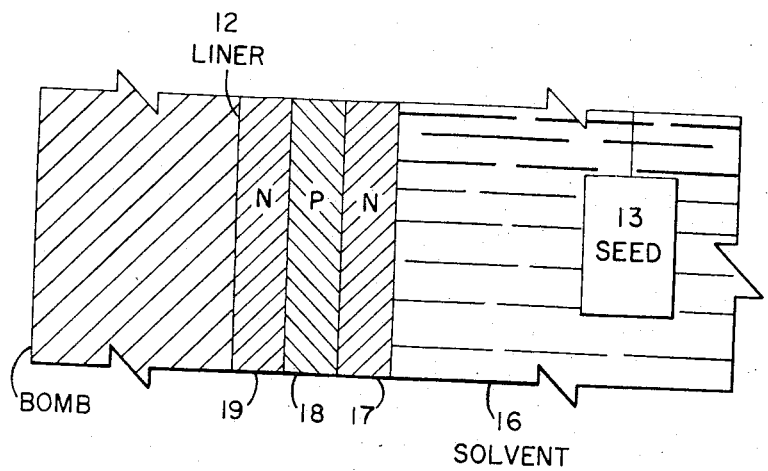
Figure 3:
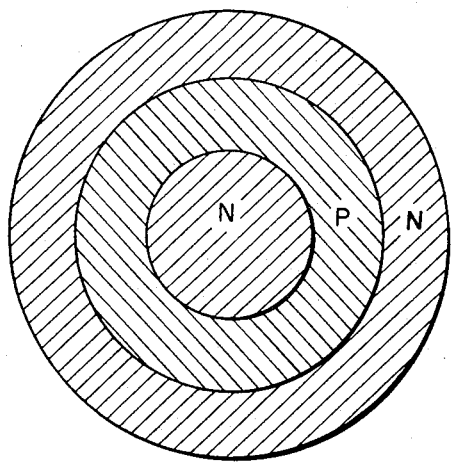

In drawings which illustrate novel apparatus suitable for use in practising the method aspects of the invention, FIGURE 1 is a cross-section of a bomb for producing P-N junctions in accordance with the method of the present invention, FIGURE 2 is a fragmentary cross-section of a bomb constructed in accordance with the present invention, and FIGURE 3 is a cross-section of a form of nutrient for use with the present invention.

As illustrated in FIGURE 1 apparatus for use in practising the method aspects of the present invention consists of a bomb 10 fitted with a cap 11 secured to the bomb by means not shown, and a liner 12. Crystals seeds 13 are positioned in the bomb 10 above the baffle 14 and a quantity of nutrient 15 is situated beneath the baffle 14. A suitable solvent 16 fills the interior of the bomb and serves to carry dissolved nutrient 15 to the crystal seeds 13 to grow crystals thereon. The solvent 16 in addition to being a solvent for the nutrient may also contain suitable mineralizers to promote the dissolving of the nutrient 15 into the solvent 16.

FIGURE 2 illustrates a particular form of liner 12 which may be used in accordance with one aspect of the invention. This liner is provided with a plurality of layers 17, 18 and 19 which are dissolved in turn during the growth of crystals. In accordance with one aspect of the invention the layer 17 may be, for example, a material which acts as a donor of electrons in the crystal structure being grown, the layer 18 may be a material which acts as an acceptor of electrons in the crystal structure being grown, and the layer 19 may be a material which is a donor of electrons in the crystal structure being grown. During crystal growth the successive layers 17, 18 and 19 are dissolved into the solvent 16 and are transported to the seeds 13 together with the nutrient to form successive layers in the crystal of opposite conductivity types.

FIGURE 3 illustrates another means of adding impurities to the solution during the growth of P-N junctions and this means is shown as consisting of a ball of material having successive layers of opposite conductivity types which are successively dissolved during the growth of the crystals to provide areas of opposite conductivity within the crystal.

In accordance with one aspect of the invention P-N junctions may be grown in crystals by placing seeds 13 of one conductivity type in a bomb 10 having a liner 12 containing impurities which will promote the growth of crystals of the opposite conductivity type to the conductivity of the seed. By growing the crystals in successive stages with appropriate changes of impurity in the liner 12 of the bomb 10, a large number of P-N junctions may be successively grown in a single crystal. Alternately the crystals may be transferred from a first bomb having a liner of one impurity to another bomb having a liner of the opposite impurity, and successive layers of opposite conductivity built up by transferring the crystals from one bomb to another during the growth of the crystals. An advantage of the method in accordance with the present invention is that P-N regions can be layed down on a crystal without compensation and overdoping, as is the case with crystals which are grown by the Czochralski method. In accordance with the method of the present invention P-N doping agents are added alternately in excess to the melt in order to produce the required P or N layers. Also it is much easier to make P-N junctions by the methods of the present invention than by diffusing into the crystal the doping material plated on the surface.

An example of the preparation of a P-N junction in accordance with the present invention is as follows:

Natural iron pyrites was used as seeds, these seeds being in the characteristic cubic form. For the nutrient, natural iron pyrites of opposite conductivity to the seeds was roasted in a closed quartz tube under vacuum at 500° C. thus transforming it into marcasite. A 1 normal $Na_2S$ aqueous solution was employed in the bomb which was filled to 67% of its total volume. The nutrient was kept at 400° C. and a gradient of 26° C. falling from bottom to the top of the bomb was maintained. The liner used was pure silver. Under these conditions a rate of growth of about 0.0015" per day was observed. The inside dimensions of the liner were 6" by ⅞" inside diameter.

The minimum thickness of layer which may be grown depends on many factors, however in a typical run with a minimum of nutrient, growth amounted to a layer thickness of about 0.0005".

A further feature of the method of the invention is that the basic elements may be added individually to the nutrient section of the bomb without being chemically combined, for example iron pyrites can be grown from a nutrient consisting of iron and sulphur as separate ingredients as well as ferrous sulphide and sulphur. The same is equally true for most other nutrient compounds.

It should be noted that an important feature of the hydrothermal mineral synthesis method is that it is possible to obtain crystals of a low temperature phase, for example iron pyrite is only stable below 450° C. If $FeS_2$ is cooled from the melt one always gets the high temperature phase which is marcasite. The marcasite will not transform completely into iron pyrites because there is a change in volume associated with this transformation. Thus in other crystallization methods this change in volume has prevented obtaining a single crystal of a low temperature phase from a high temperature phase. This is the reason why pyrites could not be made in single crystal form before the development of hydrothermal mineral synthesis. If the crystallization of $FeS_2$ is carried out at temperatures above 450° C., marcasite crystals are obtained.

Since a great many materials have low temperature transformations this method permits obtaining single crystals of many materials one could not obtain previously. Examples of materials which can be obtained this way are $Cu_2FeSnS_4$, and $CuBiS_2$.

Numerous semiconducting compounds are useful in the present invention and a great many await tests like GaAs, GaSb, InAs and other important Group III-Group V compounds.

There is an enormous number of compounds which can be grown hydrothermally, a great number of them being semiconducting, most of them being natural minerals like chalcopyrite ($CuFeS_2$) to which a variety of artificial analogues can be added by replacing Cu by Ag or Au, Fe by Ga, In or Tl and S by Se or Te. The same is possible with other minerals like CoAsS, $Cu_2FeSnS_4$, $PbCuSbS_3$ etc. for which artificial analogues can be made by replacing one or more elements by another one.

Among the pure elements which can be crystallized hydrothermally As, Sb, Bi and Te can be deposited in semiconducting modifications. There is also a chance of growing single crystals of black semiconducting phosphorous which has not previously been obtained.

The sulphides such as PbS, CuS, $FeS_2$, $Bi_2S_3$ etc. for which the present method is most suitable are almost unlimited in number as are the selenides, tellurides, arsenides, antimonides and bismuthides and the combinations of sulpharsenides, sulphantimanides and sulphbismuthides such as $PbS \cdot Sb_2S_3$, $Hg_3SbS_3$, $CuBiS_2$ etc. Galena, PbS, deserves special mention because it is often found in nature with P-N junctions. It was one of the first semiconductors in use and such natural crystals have been used for diode detectors in the earliest crystal radio-sets.

Apart from some unstable metal oxides like HgO and $Ag_2O$ etc. and some with an usually low or high number of valences like TiO, $Mn_2O$ or $PbO_3$ etc. a large number of oxides are useful with this invention. $Fe_3O_4$ and NiO have been hydrothermally grown into crystals.

In general there is a very large number of minerals which can be synthesised hydrothermally into crystalline form. At least 95% of all the free grown crystals in nature which are found in all sorts of veins, geodes and cavities are grown hydrothermally. Accordingly, it should be possible to reproduce the vast majority of these compounds in the laboratory.

The method of the present invention may also be used to grow monotype crystals of intrinsic material which may later be processed by known means to produce P-N junctions. Accordingly the present invention is not to be limited to the method of producing such junctions but it also encompasses a method of producing intrinsic material for later processing to form such junctions.

It is expected that solvents such as $CO_2$, $SO_2$, $NH_3$ etc. in liquid form may be used with the present invention and the introduction of electric currents between the nutrient and crystal, in other words electrolysis under hydrothermal conditions, may result in a vast variety of compounds which may not be produced by other means.

I claim:

1. A method of making P-N junctions in a crystalline semiconductor comprising positioning a crystal seed of one conductivity type of said semiconductor material in apparatus for hydrothermally growing crystals, placing a nutrient of said semiconductor material in said apparatus, filling said apparatus with a hydrothermal solvent for said nutrient, dissolving into said solvent said nutrient and doping material to cause the precipitation of a layer of opposite conductivity type on said seed, wherein said crystalline semiconductor is iron pyrites, said crystal seed is natural iron pyrites, said nutrient is natural iron pyrites of opposite conductivity type to said seed, said nutrient being roasted in a closed quartz tube under vacuum at approximately 500° C. prior to introduction into said apparatus, and said solvent is a 1 normal aqueous solution of $Na_2S$, said solvent filling said apparatus to 67% of its total volume, the temperature of said apparatus during precipitation being approximately 400° C.

References Cited

UNITED STATES PATENTS

| | | | |
|---|---|---|---|
| 3,084,078 | 4/1963 | Anderson | 148—172 |
| 3,177,100 | 4/1965 | Mayer et al. | 148—1.6 |
| 3,201,209 | 8/1965 | Caporaso et al. | 23—301 |
| 1,958,014 | 5/1934 | Nicolson | 23—301 X |
| 2,615,797 | 10/1952 | Bruzau | 23—301 X |
| 2,785,058 | 3/1957 | Buehler | 23—301 |
| 2,789,258 | 4/1957 | Smith | 148—174 X |
| 2,895,812 | 7/1959 | Kohman | 23—301 |
| 3,179,541 | 4/1965 | Hull | 148—174 X |
| 3,198,671 | 8/1965 | Kikhott | 23—301 X |

OTHER REFERENCES

Semiconductors, by Hannay, published 1959 by Reinhold Co., pages 761, 167 and 580–585.

HYLAND BIZOT, *Primary Examiner.*

RICHARD O. DEAN, *Examiner.*